J. KIEL.
HARROW BAR.
APPLICATION FILED MAR. 2, 1912.
1,080,698.
Patented Dec. 9, 1913.
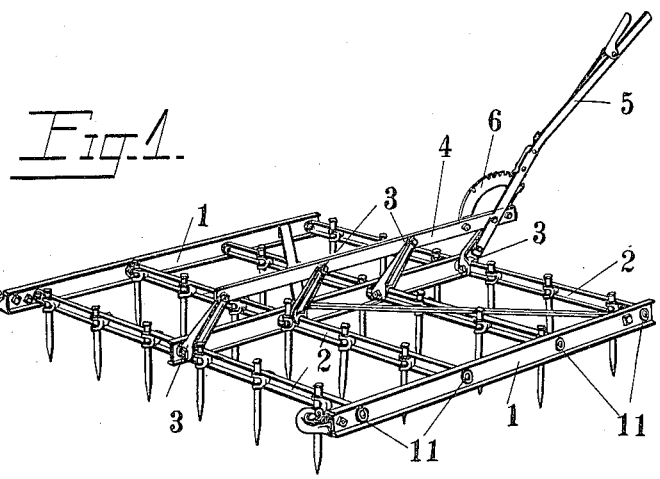
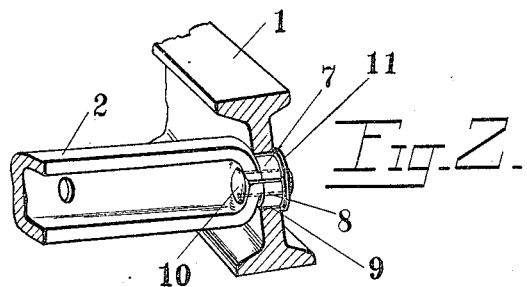
Witnesses:
Harland E. Rich
Bertha A. Maurer.
Inventor:
John Kiel
by W. C. Johnston
his Attorney.

UNITED STATES PATENT OFFICE.

JOHN KIEL, OF MOLINE, ILLINOIS, ASSIGNOR TO DEERE & COMPANY, OF MOLINE, ILLINOIS, A CORPORATION OF ILLINOIS.

HARROW-BAR.

1,080,698. Specification of Letters Patent. Patented Dec. 9, 1913.

Application filed March 2, 1912. Serial No. 681,020.

*To all whom it may concern:*

Be it known that I, JOHN KIEL, a citizen of the United States, residing at Moline, in the county of Rock Island and State of Illinois, have invented certain new and useful Improvements in Harrow-Bars, of which the following is a specification, reference being had therein to the accompanying drawing.

My invention relates to harrows, particularly to that class of harrows in which the tooth-carrying bars are rockable and have their ends supported by the side-bars of the harrow-frame; and my object is to simplify the construction and operation, and to economize in material and labor.

Referring to the drawings in which similar numerals indicate identical parts in all the views—Figure 1 is a perspective view of a harrow embodying my invention. Fig. 2 is a detail, enlarged and in part section.

The harrow is composed of side-bars 1 having a series of tooth-carrying bars 2 journaled thereon; projecting upwardly from each tooth-carrying bar 2, and rigidly secured thereto, are arms 3 pivotally connected to an adjusting-bar 4. A lever 5 is secured to the arm 3 on the rear tooth-carrying bar, and is provided with the usual latching mechanism to engage with a toothed sector 6 mounted on the adjusting-bar 4. Ordinarily in harrows having the tooth-carrying bars journaled at their ends on the side-bars, a member distinct from the tooth-carrying bar but secured thereto, is employed to support the ends of the tooth-carrying bars, the manufacture and attachment of such members adding materially to the cost of the harrow. As shown more clearly in Fig. 2 I dispense entirely with an attached part to the tooth-carrying bar to be employed as a journal, and in lieu thereof I shape the end 7 of the bar by pressure or otherwise, so that it is cylindrical in form and has a central opening 8 extending longitudinally thereof. In the type of harrow shown in the drawings, bearings 9, for the ends 7 of the tooth-carrying bars 2, are formed in the side-bars 1 in which the cylindrical ends 7 of the tooth-carrying bars are inserted and held therein by rivets 10 extending through the openings 8 and projecting beyond the side-bars 1 and the ends 7 of the tooth-carrying bars 2; washers 11, of greater diameter than the openings 10, are placed on the rivet ends the latter being then upset and retaining the ends 7 of the tooth-carrying bars 2 firmly in the bearings 9, and yet allowing a free rocking movement of the tooth-carrying bars 2 in their varied adjustments.

In the drawings I have shown a U or channel bar for a tooth-carrying bar, but do not confine myself to that particular shape, as it is obvious any other style of bar, capable of being pressed or forged at its ends into a journal, may be employed; and while I use rivets to secure the journaled ends of the tooth-carrying bars in their bearings on the side-bars, bolts may be employed for the same purpose.

What I claim is—

1. A harrow comprising side-bars and tooth-carrying bars, the latter having their ends formed into journals of diminished diameter adapted to rock in bearings on the side-bars, a longitudinal opening in said journals and means in said openings to secure said tooth-carrying bars from lateral movement.

2. A harrow comprising side-bars and tooth-carrying bars, the latter having their ends journaled in bearings on the side-bars, and means projecting through said journaled ends and secured outside of said bearings to secure said tooth-carrying bars from lateral movement.

3. A harrow comprising side-bars and tooth-carrying bars, the latter having their ends journaled in bearings on the side-bars, rivets projecting through said journaled ends and outside said bearings, washers on said rivets engaging with the outer side of said bearings and means to secure said washers on the rivets to prevent lateral movement of the tooth-carrying bars.

In testimony whereof I affix my signature, in presence of two witnesses.

JOHN KIEL.

Witnesses:
HARLAND E. RICH,
BERTHA A. MAURER.

---

Copies of this patent may be obtained for five cents each, by addressing the "Commissioner of Patents, Washington, D. C."